US006938243B1

(12) United States Patent
Zeevi et al.

(10) Patent No.: US 6,938,243 B1
(45) Date of Patent: Aug. 30, 2005

(54) DIAGNOSTIC ARCHITECTURE FOR USE WITH AN INTERFACE BETWEEN AN OPERATING SYSTEM AND PLATFORM FIRMWARE

(75) Inventors: Josef Zeevi, Austin, TX (US); Roderick W. Stone, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 436 days.

(21) Appl. No.: 09/668,316

(22) Filed: Sep. 22, 2000

(51) Int. Cl.$^7$ .......................... G06F 9/44; G06F 9/445; G06F 11/00
(52) U.S. Cl. ...................... 717/124; 717/126; 717/175; 714/27
(58) Field of Search ................ 717/124, 126, 717/105, 175; 714/27

(56) References Cited

U.S. PATENT DOCUMENTS

| | | | | |
|---|---|---|---|---|
| 5,157,781 A | * | 10/1992 | Harwood et al. | 714/30 |
| 5,210,855 A | * | 5/1993 | Bartol | 710/302 |
| 5,490,252 A | * | 2/1996 | Macera et al. | 709/249 |
| 5,768,541 A | * | 6/1998 | Pan-Ratzlaff | 710/304 |
| 5,781,744 A | * | 7/1998 | Johnson et al. | 710/304 |
| 5,781,798 A | * | 7/1998 | Beatty et al. | 710/10 |
| 5,805,796 A |   | 9/1998 | Finch et al. | |
| 5,875,293 A |   | 2/1999 | Bell et al. | |
| 5,896,494 A | * | 4/1999 | Perugini et al. | 714/27 |
| 5,954,796 A | * | 9/1999 | McCarty et al. | 709/222 |
| 5,963,743 A | * | 10/1999 | Amberg et al. | 717/124 |
| 5,964,891 A | * | 10/1999 | Caswell et al. | 714/31 |
| 5,991,543 A | * | 11/1999 | Amberg et al. | 717/175 |
| 5,995,757 A | * | 11/1999 | Amberg et al. | 717/175 |
| 6,002,868 A | * | 12/1999 | Jenkins et al. | 717/105 |
| 6,006,344 A | * | 12/1999 | Bell, Jr. | 714/27 |
| 6,058,055 A | * | 5/2000 | Brunelle | 714/719 |
| 6,101,617 A | * | 8/2000 | Burckhartt et al. | 714/23 |
| 6,134,615 A | * | 10/2000 | Chari et al. | 717/174 |
| 6,275,931 B1 | * | 8/2001 | Narayanaswamy et al. | 713/2 |
| 6,304,839 B1 | * | 10/2001 | Ho et al. | 714/39 |
| 6,311,321 B1 | * | 10/2001 | Agnihotri et al. | 717/120 |
| 6,363,452 B1 | * | 3/2002 | Lach | 710/316 |
| 6,686,838 B1 | * | 2/2004 | Rezvani et al. | 709/224 |
| 6,704,827 B1 | * | 3/2004 | Smith et al. | 714/25 |
| 6,732,262 B1 | * | 5/2004 | Sakai | 714/7 |
| 6,772,249 B1 | * | 8/2004 | Lada et al. | 710/100 |
| 6,782,541 B1 | * | 8/2004 | Cohen et al. | 719/318 |

* cited by examiner

*Primary Examiner*—Todd Ingberg
*Assistant Examiner*—Qamrun Nahar
(74) *Attorney, Agent, or Firm*—Haynes and Boone, LLP

(57) ABSTRACT

A method performed by a computer system is provided. The method includes detecting a test module interface associated with a test module and calling a function identified by the test module interface to cause a test configuration of the test module to be created.

12 Claims, 4 Drawing Sheets

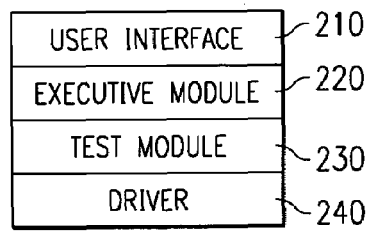
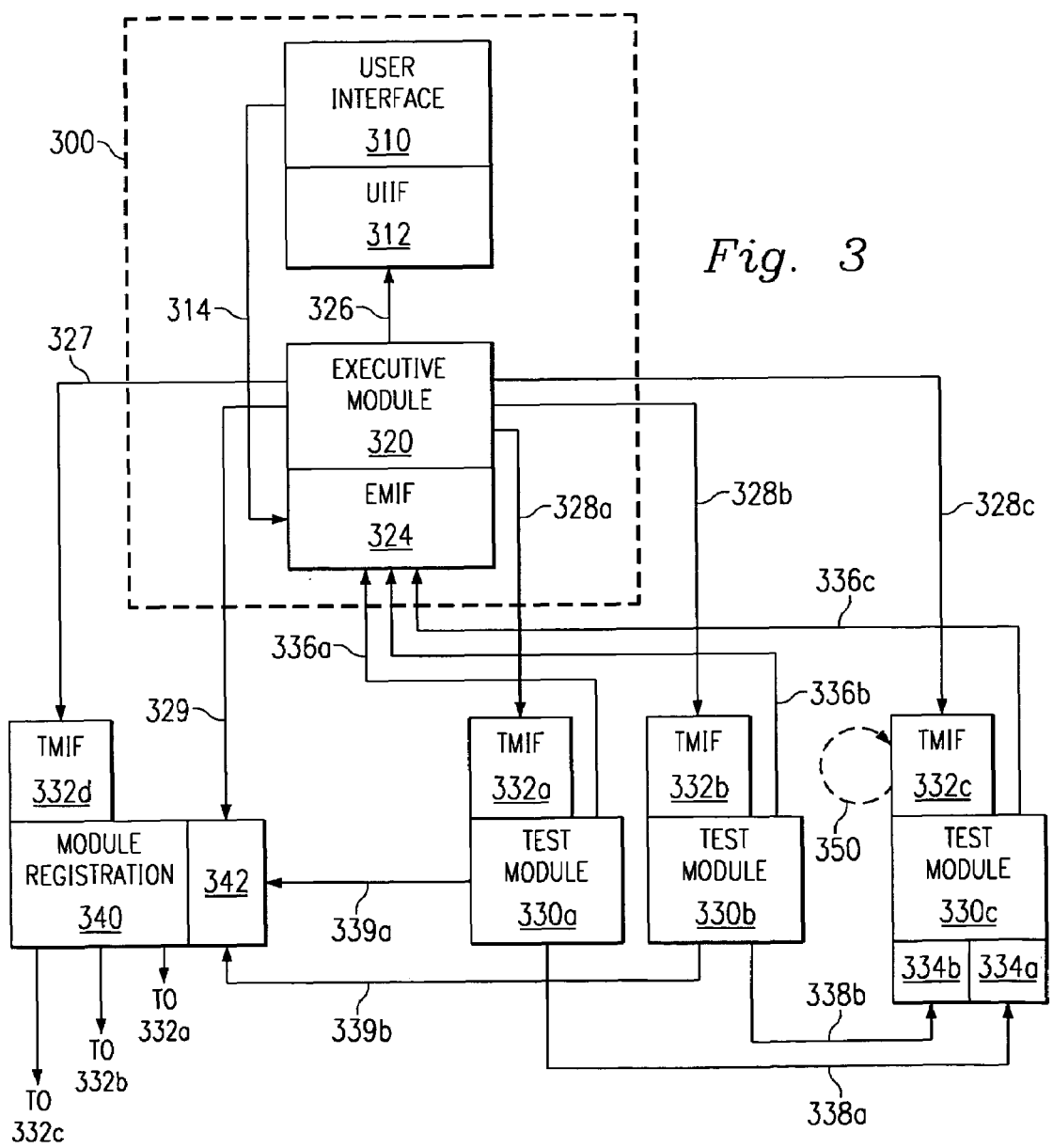

400
| MODULE ID (402) | POINTER (404) | FUNCTION (406) |
|---|---|---|
| | | |
| 408 ∘∘∘ | ∘∘∘ | ∘∘∘ |
| | | |

*Fig. 4a*

400
| | | | |
|---|---|---|---|
| EXECUTIVE MODULE 320 ID | TMIF 332a POINTER | fQuitUsing | 422 |
| EXECUTIVE MODULE 320 ID | TMIF 332b POINTER | fQuitUsing | 424 |
| EXECUTIVE MODULE 320 ID | TMIF 332c POINTER | fQuitUsing | 426 |
| TEST MODULE 330a ID | TMIF 332c POINTER | fQuitUsing | 428 |
| TEST MODULE 330b ID | TMIF 332c POINTER | fQuitUsing | 430 |

*Fig. 4b*

400
| | | | |
|---|---|---|---|
| EXECUTIVE MODULE 320 ID | TMIF 332a POINTER | fQuitUsing | 422 |
| EXECUTIVE MODULE 320 ID | TMIF 332b POINTER | fQuitUsing | 424 |
| EXECUTIVE MODULE 320 ID | TMIF 332c POINTER | fQuitUsing | 426 |
| TEST MODULE 330a ID | TMIF 332c POINTER | fQuitUsing | 428 |
| TEST MODULE 330b ID | TMIF 332c POINTER | fQuitUsing | 430 |

*Fig. 4c*

400
| | | | |
|---|---|---|---|
| EXECUTIVE MODULE 320 ID | TMIF 332a POINTER | fQuitUsing | 422 |
| EXECUTIVE MODULE 320 ID | TMIF 332b POINTER | fQuitUsing | 424 |

*Fig. 4d*

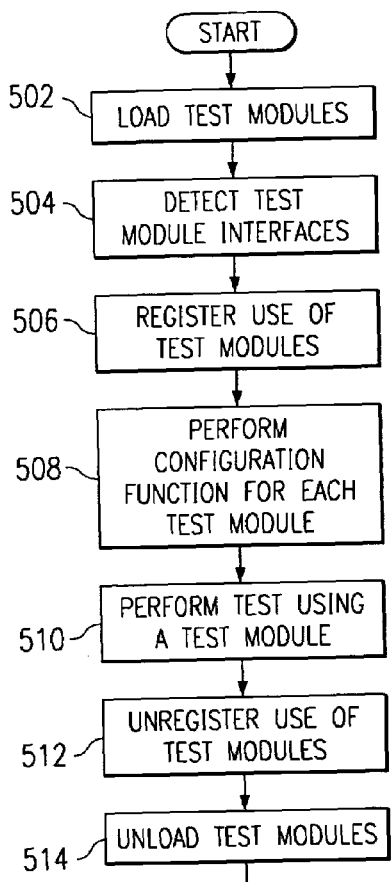
Fig. 5a
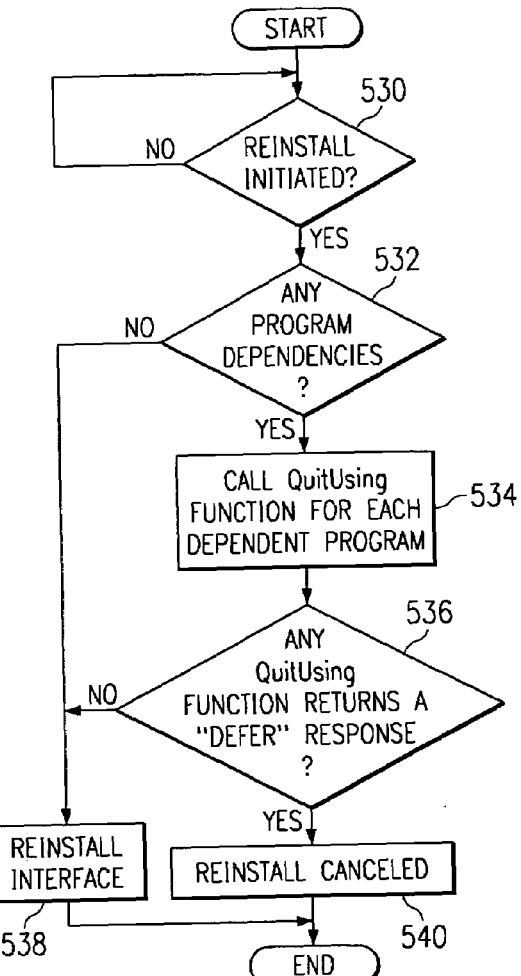
Fig. 5c
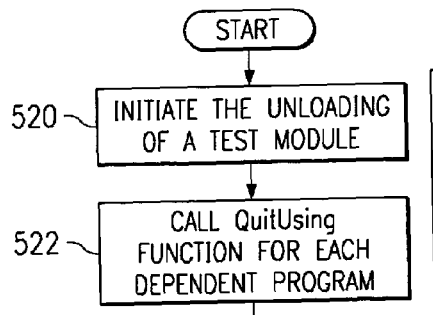
Fig. 5b
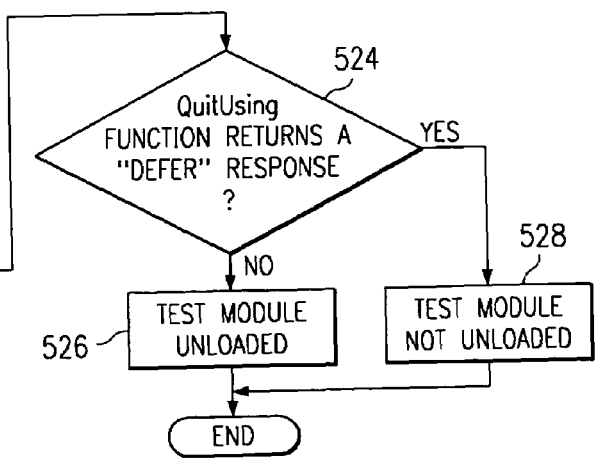

DIAGNOSTIC ARCHITECTURE FOR USE WITH AN INTERFACE BETWEEN AN OPERATING SYSTEM AND PLATFORM FIRMWARE

This application relates to co-pending U.S. patent application Ser. No. 09/333,786, filed on Jun. 15, 1999, entitled "Method and Apparatus for Testing Custom-Configured Software/Hardware Integration in a Computer Build-to-Order Manufacturing Process", naming Thomas Vrhel Jr., Gaston M. Barajas, Paul J. Maia, and W. D. Todd Nix as inventors.

This application relates to co-pending U.S. patent application Ser. No. 09/237,760, filed on Jan. 26, 1999, entitled "A Method of Installing Software on and/or Testing a Computer System", naming Richard D. Amberg, Roger Wong, and Michael Lynch as inventors.

This application relates to co-pending U.S. Pat. No. 5,995,757, filed on Aug. 29, 1997, entitled "Software Installation and Testing for a Build-to-Order Computer System", naming Richard D. Amberg, Roger W. Wong, and Michael A. Brundridge as inventors.

This application relates to co-pending U.S. Pat. No. 5,963,743, filed on Aug. 29, 1997, entitled "Database for Facilitating Software Installation and Testing for a Build-to-Order Computer System", naming Richard D. Amberg, Roger W. Wong, and Michael A. Brundridge as inventors.

The co-pending applications are incorporated by reference in their entirety, and are assigned to the assignee of this application.

BACKGROUND

The disclosures herein relate generally to computer systems and, more particularly, to a diagnostic architecture for use with an interface between an operating system and platform firmware.

In the process of manufacturing a build-to-order computer system, diagnostic software may be copied to the computer system and executed to ensure the reliability of the system. Computer systems offered by a computer manufacturer, particularly build-to-order computer systems, may include different features and devices. Accordingly, the computer manufacturer may need to customize the diagnostic software for each platform that the manufacturer offers. The process of customizing diagnostic software for computer systems may require a costly and inefficient development effort.

In addition, diagnostic software may include one or more test modules associated with one or more devices provided by a third party vendor. As used herein, the term test module refers to a set of information that may be used to test or perform diagnostics or other services on a component of a computer system. The information may include, for example, one or more test routines, test information, device information, parameter information, and other programs. The test modules may be used to perform tests on the components of a computer system. The test modules provided by the third party vendors may not conform to a uniform standard or convention, however. As a result, additional development effort may be needed to overcome the lack of standardization and incorporate test modules provided by third party vendors into diagnostic software that may be used in a build-to-order manufacturing process.

Computer systems typically include an operating system and platform firmware and may include an interface between the operating system and the platform firmware. One such interface is described in the Extensible Firmware Interface Specification (hereafter "EFI"), version 0.99, Apr. 19, 2000 published by Intel Corporation, 2200 Mission College Blvd., Santa Clara, Calif. 95052, (408) 765-8080, and incorporated by reference herein. Although EFI may be used in booting a computer system, it would be desirable to be able to use EFI in a diagnostic architecture.

Therefore, what is needed is a diagnostic architecture that allows a test module to be used in a build-to-order manufacturing environment. What is also needed is a diagnostic architecture that uses and enhances the capabilities of an interface between an operating system and platform firmware in a computer system.

SUMMARY

One embodiment, accordingly, provides a method performed by a computer system. The method includes detecting a test module interface associated with a test module and calling a function identified by the test module interface to cause a test configuration of the test module to be created.

A principal advantage of this embodiment is that it allows a test module to be used in a build-to-order manufacturing environment. The test module is loaded onto a build-to-order computer system. A test module interface associated with the test module provides a user interface or other program with the ability to select test routines or other information in the test module. The test module interface may be created using the capabilities of an interface between an operating system and platform firmware.

BRIEF DESCRIPTION OF THE DRAWINGS

FIG. 2 is a diagram illustrating layers of software in a diagnostic architecture.

FIG. 3 is a diagram illustrating an example of the use of test module interfaces in a diagnostic architecture.

FIG. 4a is a diagram illustrating an embodiment of a registration table.

FIG. 4b is a first diagram illustrating an example of a registration table in operation.

FIG. 4c is a second diagram illustrating an example of a registration table in operation.

FIG. 4d is a third diagram illustrating an example of a registration table in operation.

FIG. 5a is a flowchart illustrating an embodiment of a method for using test module interfaces in a diagnostic architecture.

FIG. 5b is a flowchart illustrating an embodiment of a method for unloading a test module in a diagnostic architecture.

FIG. 5c is a flowchart illustrating an embodiment of a method for reinstalling a test module interface in a diagnostic architecture.

DETAILED DESCRIPTION

Figure 1:
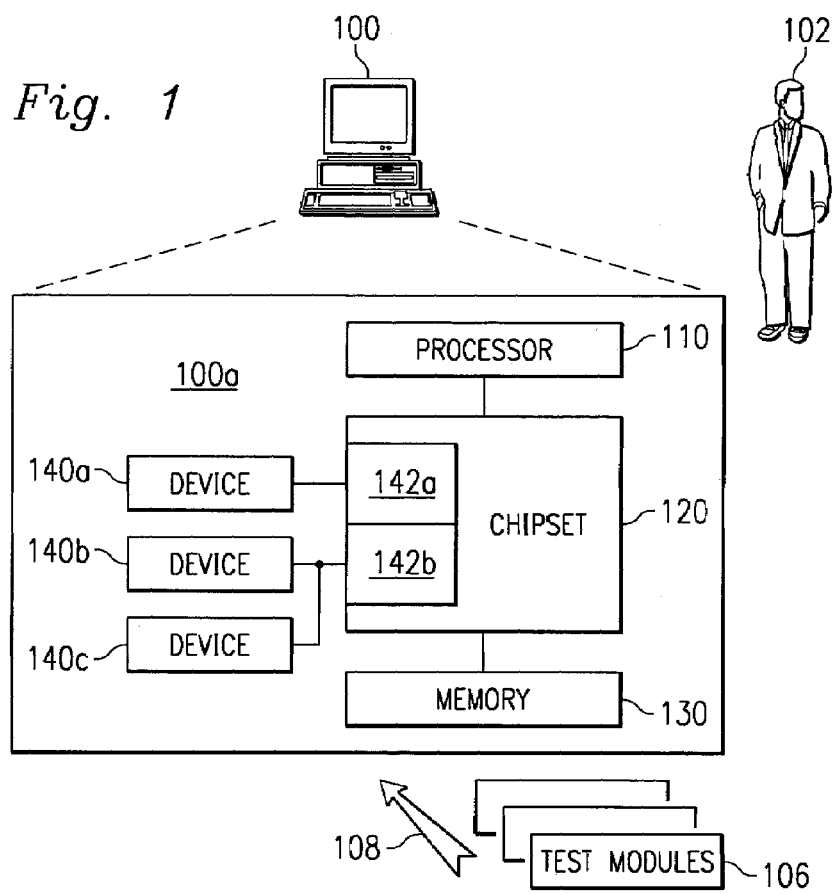
FIG. 1 is a diagram illustrating an embodiment of computer system.

FIG. 1 is a diagram illustrating an embodiment of a computer system 100. Computer system 100 is operable by a user 102 and includes a processor 110, a chipset 120, a memory 130, and devices 140a, 140b, and 140c as shown in block 100a. Device 140a is coupled to a port 142a in chipset 120. Devices 140b and 140c are coupled to a shared bus 142*b* in chipset 120. Computer system 100 may include other features not shown in FIG. 1.

In the process of manufacturing computer system 100, a computer manufacturer stores a plurality of test modules 106 onto computer system 100 as indicated by arrow 108. As noted above, the term test module refers to a set of information that may be used to test or perform diagnostics or other services on a component of a computer system. The information may include, for example, one or more test routines, test information, device information, parameter information, and other programs. The test modules may be used to perform tests on the components of a computer system. Test modules 106 are configured to operate in a diagnostic architecture described herein. In particular, each test module 106 is configured to expose a test module interface. A test module interface provides a user interface, an executive, or other program with the ability to access information and call functions within the test module. In the following description, an executive will be described as interacting with a test module interface. It is noted, however, that a user interface or other program may also interact with a test module interface in ways similar to those described below.

Figure 6:
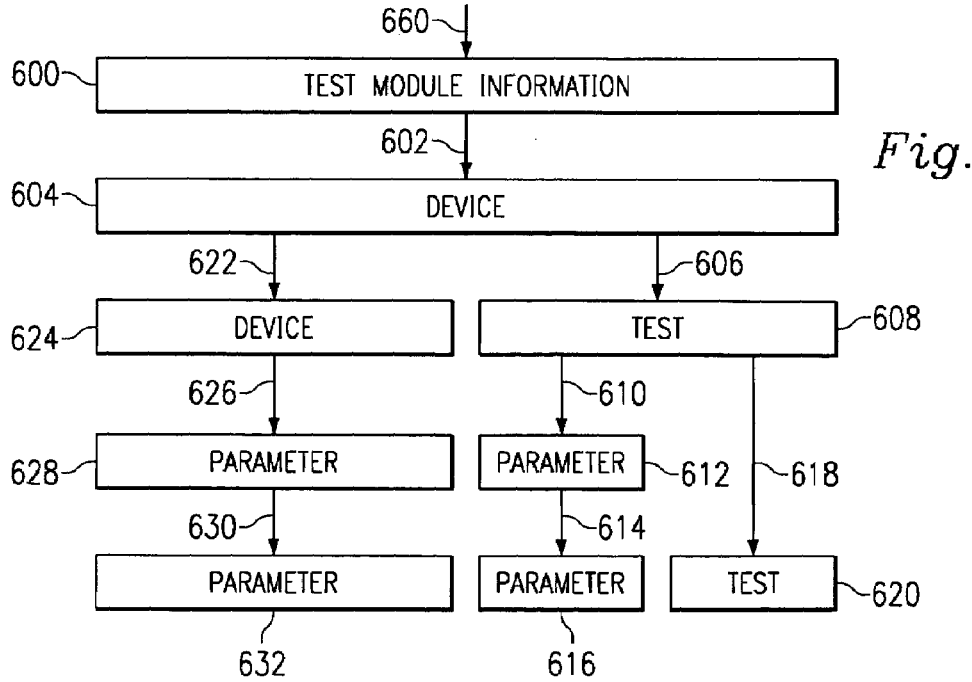
FIG. 6 is a diagram illustrating an example of a test configuration.

A test module interface provides an executive with the ability to detect information in a test module. In one particular embodiment, each test module interface provides a function called FCONFIGURE that is callable by an executive. Once called, FCONFIGURE generates a test configuration for the associated test module and returns a pointer to the test configuration to the executive. The test configuration includes information associated with the test module. This information may include information regarding one or more devices, information regarding one or more test functions, and information regarding one or more parameters. The test configuration may omit any of the above information or include other information as desired. FIG. 6, described below, illustrates an example of a test configuration.

Test modules 106 each cause an associated test module interface to be installed. After a test module 106 is loaded into a memory, such as memory 130 on computer system 100, a test module 106 causes its associated test module interface to be created and stored in the memory. A test module 106 may cause the test module interface to be created in response to certain conditions being met. These conditions may include the presence of a device associated with the test module 106, for example device 140*a*, device 140*b*, or device 140*c*, or the presence of information associated with the test module 106, for example another test module, another program, or data. If a condition is not met, the test module 106 does not install a test module interface and may unload from the memory.

An executive detects the installed test module interfaces within computer system 100. The executive causes a test configuration to be created for each test module 106 using an associated test module interface as noted above. A test configuration of a test module 106 allows the user interface to detect test functions and other routines within the test module that may be executed by computer system 100. Other programs including other test modules may also detect test functions and other routines within a given test module 106 using its test configuration. The executive, in conjunction with a user interface, may cause a list of available test functions or routines to be displayed on a display of computer system 100. The executive is configured to call a test function or other routine for execution by computer system 100 and may do so in response to an input from user 102 received through a user interface.

By having test modules 106 conditionally install test module interfaces on computer system 100, a diagnostic architecture may be created for use in a build-to-order manufacturing environment. A computer manufacturer may install the same set of test modules 106 onto each computer system that it builds. Test modules 106 can each independently determine whether to install their test module interfaces in response to one or more conditions being met. If a condition for a particular test module 106 is not met, then that test module 106 does not install a test module interface. Accordingly, an executive would not cause a test configuration to be created for this test module 106 and would not cause test functions within the test module 106 to be executed. In contrast, an executive detects the installed test module interfaces. Using the installed test module interfaces, an executive can cause test configurations to be created and cause test functions to be executed. In this way, only the test modules 106 that are used by a particular computer system such as computer system 100 become available to the executive.

For example, a first test module 106 that is associated with device 140*a* may be loaded onto computer system 100. The first test module 106 detects the presence of device 140*a* and creates a test module interface. The executive detects the test module interface, causes a test configuration to be created, and causes test functions associated with device 140*a* to be executed on computer system 100. In this same example, a second test module 106 may also be loaded onto computer system 100. The second test module 106, however, is associated with a device or information that is not present on computer system 100. Accordingly, the second test module 106 does not install its test module interface and may unload from the memory. As a result, the executive will not detect a test module interface associated with this second test module 106, and test programs within the second test module 106 will not be exposed to the executive. Although the presence or absence of device information was used as a condition for installing a test module interface in this example, other conditions may be used as noted above.

A test module may create a test module interface using features specified in the Extensible Firmware Interface Specification ("EFI") noted above and incorporated by reference. In particular, a test module interface is created as a protocol as defined by EFI. By creating a test module interface as an EFI protocol, other programs are given the ability to detect and interact with the test module interface. An executive, for example, detects each test module interface on computer system 100 by using EFI support for protocol registration. The executive and other programs such as a user interface also create an EFI protocol.

The diagnostic architecture described herein allows computer system 100 to automatically reconfigure without requiring a complete reload or reboot. A test module 106 may dynamically reinstall its test module interface at any time without rebooting computer system 100. A test module 106 may dynamically reinstall its test module interface in response to a device change associated with the test module 106. For example, a device such as device 140*a*, 140*b*, or 140*c* may be added to, removed from, or substituted for another device in computer system 100, or another test module may expose an additional device. In response, a test module 106 associated with the changed device may be loaded or unloaded, as appropriate, and may cause a test module interface to be installed, deleted, or reinstalled, as appropriate, without the need to reboot computer system 100. Where the test module interface includes an EFI protocol, the process of installing, deleting, or reinstalling the test module interface may also include notifying an executive of the change. Accordingly, the executive can cause a test configuration to be created or recreated where the test module interface is installed or reinstalled and can stop using a test module interface, and hence the test module 106, where the test module interface is deleted.

To allow a test module 106 to be safely unloaded from memory, a registration module is used to register uses of the test module 106 by other programs. By registering uses of the test module 106, the test module 106 can insure that no other program attempts to access information associated with the test module 106 after it unloads. An example of a registration table used by a registration module is described below in FIG. 4*a*. In response to a test module 106 seeking to unload, the registration module is accessed to determine what other programs are registered as using the test module 106. Each of these programs is notified to stop using the test module 106. After each of the programs responds that it has stopped using the test module 106, the test module 106 can cause itself to unload. If a program responds that it is still using the test module 106, then the test module 106 can cancel the unload. The test module 106 may seek to unload at a later time.

In one particular embodiment, a test module 106 causes a QUITUSING function to be called for each program that is registered in the registration module as using the test module 106. Each QUITUSING function returns either an OK signal indicating that the test module 106 can unload or a DEFER signal indicating that the test module 106 should not unload. If each QUITUSING function returns an OK signal, then the test module 106 causes itself to be unloaded. If one or more of the QUITUSING functions returns a DEFER signal, then the test module causes the unloading to be canceled and does not unload. The test module 106 may attempt to unload at a later time.

The registration module can also be used in the process of reinstalling a test module interface. In response to a test module 106 seeking to reinstall its interface, possibly in response to a condition noted above, the test module 106 determines whether a program dependency exists using the registration module. In particular, the test module 106 determines whether another program is registered as using the test module 106. Each program that is registered as using the test module 106 is notified to stop using it. After each of the programs responds that it has stopped using the test module 106, the test module 106 can cause its test module interface to be reinstalled. If a program responds that it is still using the test module 106, then the test module 106 can cancel the reinstall. The test module 106 may seek to reinstall at a later time. In one particular embodiment, the QUITUSING function described above is used to handle these program dependencies.

The embodiment of computer system 100 shown in FIG. 1 is shown by way of example. Other computer systems may include other numbers or types of processors, devices, chipsets, and/or memories and these components may be connected in ways other than the ways shown in FIG. 1. Devices 140*a*, 140*b*, and 140*c* may each be any device suited for use in a computer system including a hard disk drive, a CDROM drive, a graphics subsystem, an audio subsystem, a printer, a scanner, or an input device such as a keyboard or mouse. Memory 130 may be any memory or combination of memory elements suited for use in a computer system including any type of ROM, RAM, hard disk drive, or other type of magnetic or optical storage device.

In one particular embodiment, test modules 106 are stored onto a hard disk drive on computer system 100 and are loaded to and unloaded from memory 130 in order to be executed. In this embodiment, test module interfaces are stored in memory 130.

FIG. 2 is a diagram illustrating layers of software in a diagnostic architecture. FIG. 2 shows a high level diagram of the diagnostic architecture described in FIG. 1. In FIG. 2, a user interface layer 210, an executive module layer 220, a test module layer 230, and a driver layer 240 are shown. Each software layer 210, 220, 230, and 240 allows other layers to interact with it using an interface such as the test module interface described above.

Test modules and device drivers are loaded into a memory and expose their interfaces. In some instances, a test module is included in a device driver. The test module interface provides a way for an executive to access information in the test module. Similarly, an executive exposes an executive module interface to allow a test module and a user interface to access information in the executive module, and the user interface exposes a user interface interface to allow an executive module to access information in the user interface. Each interface may utilize an EFI protocol as noted above. The executive module and/or the user interface may cause the test modules to be loaded into or unloaded from a memory.

FIG. 3 is a diagram illustrating an example of the use of test module interfaces in a diagnostic architecture. In FIG. 3, a program 300 that includes a user interface 310 and an executive module 320 is shown. User interface 310 exposes user interface interface ("UIIF") 312 and executive module 320 exposes executive module interface ("EMIF") 324. FIG. 3 also includes test modules 330*a*, 330*b*, and 330*c* and a registration module 340. Test modules 330*a*, 330*b*, and 330*c* expose test module interfaces ("TMIF") 332*a*, 332*b*, and 332*c*, respectively, and registration module 340 exposes TMIF 332*d*. Test module 330*c* also exposes additional interfaces 334*a* and 334*b*, and registration module 340 also exposes interface 342. The various interfaces 312, 324, 332*a*, 332*b*, 332*c*, 332*d*, 334*a*, 334*b*, and 342 may be exposed in response to each interface's associated program being loaded.

The arrows in FIG. 3 represent pointers to interfaces that are stored by each program. For example, user interface 310 stores a pointer 314 to EMIF 324, and executive module 320 stores a pointer 326 to UIIF 326. Executive module 320 detects the test module interfaces using EFI and stores pointers 328*a*, 328*b*, and 328*c* to TMIFs 330*a*, 330*b*, and 330*c*, respectively. Executive module 320 also detects TMIF 327 and interface 342 of registration module 340 and stores pointers 327 and 329, respectively. As described above, test modules 330*a*, 330*b*, and 330*c* may cause their respective TMIFs 332*a*, 332*b*, and 332*c* to be installed in response to the presence or absence of certain conditions.

After executive module 320 detects TMIFs 332*a*, 332*b*, and 332*c*, it calls functions identified by TMIFs 332*a*, 332*b*, and 332*c* to cause test configurations (not shown in FIG. 3) to be created for test modules 330*a*, 330*b*, and 330*c*, respectively. Executive module 320 can then pass information from the test configurations to user interface 310 and call test programs identified by the test configurations for execution.

Executive module 320 also registers its use of test modules 330*a*, 330*b*, and 330*c* with registration module 340. Registration module 340 creates a table in a memory to maintain a list of programs that are using other programs such as test modules. FIG. 4*a* is a diagram illustrating an embodiment of a registration table 400. Registration table 400 includes entries, such as entry 408, that each include a module ID 402, a pointer 404, and a function indicator 406. Module ID 402 identifies the program registering its use of another program. Pointer 404 identifies the program being used by the program identified by module ID 402. Function indicator 406 identifies a function that may be called to request that the program identified by module ID 402 stop using the program associated with pointer 404. Registration table 400 includes one entry for each registered use of a program. Other embodiments of registration tables may store other types of information.

The operation of registration table 400 is seen by way of an example. FIGS. 4b, 4c, and 4d are diagrams illustrating registration table 400 as it might appear at various times in the example of FIG. 3. In response to detecting TMIFs 332a, 332b, and 332c, executive module 320 registers its use of test modules 330a, 330b, and 330c, respectively, using registration module 340. Registration module 340 creates an entry for each of these uses such as entries 422, 424, and 426 in registration table 400 shown in FIG. 4b. As indicated in FIG. 4b, entry 422 includes a module ID (executive module 320 ID), a pointer (TMIF pointer 332a), and a function indicator (FQUITUSING). Similarly, entry 424 includes a module ID (executive module 320 ID), a pointer (TMIF pointer 332b), and a function indicator (FQUITUSING), and entry 426 includes a module ID (executive module 320 ID), a pointer (TMIF pointer 332c), and a function indicator (FQUITUSING). Executive module 320 ID may be executive module 320's globally unique identifier ("GUID") or another unique number assigned by EFI in each entry 422, 424, and 426. The pointers in each entry may be pointers to TMIF 332a, TMIF 332b, and TMIF 332c, respectively. The functions in each entry may refer to a function in executive module 320 that may be called to request that executive module 320 stop using the test modules 330a, 330b, and 330c associated with TMIF 332a pointer, TMIF 332b pointer, and TMIF 332c pointer, respectively.

In FIG. 3, pointer 338a indicates that test module 330a is using test module 330c via interface 334a. Similarly, pointer 338b indicates that test module 330b is using test module 330c via interface 334b. Accordingly, test modules 330a and 330b register their respective uses with registration module 340, and registration module 340 creates entries 428 and 430 as shown in FIG. 4b. Test module 330a ID may be test module 330a's GUID assigned by EFI, and test module 330b ID may be test modules 330b's GUID assigned by EFI.

At some point in operation, test module 330c or another test module may attempt to cause itself to be unloaded from memory. After being unloaded from memory, other programs will not be able to access information and test programs in test module 330c and any attempt by another program to do so may cause a system to become unstable. In order to unload from memory, test module 330c uses registration module 340 to notify other programs that are using it that it is seeking to unload. In particular, registration module 340 identifies the programs that are registered as using test module 330c using registration table 400 and calls the appropriate function to notify the programs to stop using test module 330c. As indicated by shaded entries 426, 428, and 430 in FIG. 4c, executive module 320, test module 330a, and test module 330b are registered as using test module 330c. Registration module 340 calls the appropriate function, in this case FQUITUSING, for executive module 320, test module 330a, and test module 330b. After executive module 320, test module 330a, and test module 330b respond to registration module 340 with a signal indicating that they have stopped using test module 330c, registration module 340 notifies test module 330c that it may unload.

Registration module 340 also deletes the entries in registration table 400 associated with test module 330c to result in registration table 400 shown in FIG. 4d. Test module 330c can then cause itself to be unloaded. If either executive module 320, test module 330a, or test module 330b respond to registration module with a signal indicating that test module 330c is still being used, then registration module 340 notifies test module 330c that it may not unload. Test module 330c can then cancel its unload and may attempt to unload at a later time.

At some point in operation, test module 330c or another test module may attempt to reinstall TMIF 332c as indicated by dashed arrow 350. Test module 330c and registration module 340 may follow an analogous notification process just described before test module 330c reinstalls TMIF 332c. After executive module 320, test module 330a, and test module 330b respond to registration module 340 with a signal indicating that they have stopped using test module 330c, registration module 340 notifies test module 330c that it may reinstall TMIF 332c. Registration module 340 also deletes the entries in registration table 400 associated with test module 330c to result in registration table 400 shown in FIG. 4d. Test module 330c can then delete and reinstall TMIF 332c. If either executive module 320, test module 330a, or test module 330b respond to registration module 340 with a signal indicating that test module 330c is still being used, then registration module 340 notifies test module 330c that it may not reinstall TMIF 332c. Test module 330c can then cancel the reinstall and may attempt to reinstall TMIF 332c at a later time.

FIG. 5a is a flowchart illustrating an embodiment of a method for using test module interfaces in a diagnostic architecture. In FIG. 5a, test modules are loaded as indicated in step 502. Test module interfaces are detected as indicated in step 504. Uses of test modules are registered as indicated in step 506. A configuration function is performed for each test module as indicated in step 508. A test is performed using a test module as indicated in step 510. Uses of test modules are unregistered as indicated in step 512. Test modules are unloaded as indicated in step 514.

FIG. 5b is a flowchart illustrating an embodiment of a method for unloading a test module in a diagnostic architecture. In FIG. 5b, the unloading of a test module is initiated as indicated in step 520. A QUITUSING function is called for each dependent program as indicated in step 522. A determination is made as to whether a QUITUSING function returns a "defer" response as indicated in step 524. If a QUITUSING function returns a "defer" response, then the test module is not unloaded as indicated in step 528. If no QUITUSING function returns a "defer" response, then the test module is unloaded as indicated in step 526.

FIG. 5c is a flowchart illustrating an embodiment of a method for reinstalling a test module interface in a diagnostic architecture. In FIG. 5c, a determination is made as to whether a reinstall has been initiated as indicated in step 530. The chart remains at step 530 until a reinstall has been initiated. Once a reinstall has been initiated, then a determination is made as to whether any program dependencies exist as indicated in step 532. If a program dependency does not exist, then the interface is reinstalled as indicated in step 538.

If a program dependency exists, then a QUITUSING function is called for each dependent program as indicated in step 534. A determination is made as to whether any QUITUSING function returns a "defer" response as indicated in step 536. If no QUITUSING function returns a "defer" response, then the interface is reinstalled as indicated in step 538. If a QUITUSING function returns a "defer" response, then the interface is not reinstalled as indicated in block 540.

FIG. 6 is a diagram illustrating an example of a test configuration 650. Test configuration 650 includes test module information 600, device information 604, device information 624, test information 608, test information 620, parameter information 612, parameter information 616, parameter information 628, and parameter information 632. Test module information 600 includes a pointer 602 to device information 604. Device information 604 includes a pointer 606 to test information 608 and a pointer 622 to device information 624. Test information 608 includes a pointer 618 to test information 620 and a pointer 610 to parameter information 612. Parameter information 612 includes a pointer 614 to parameter information 616. Device information 624 includes a pointer 626 to parameter information 628. Parameter information 628 includes a pointer 630 to parameter information 632.

Test module information 600 includes module specific information such as a module name, a vendor name, help text, and a version, a pointer to a device list such as pointer 602, and a pointer (not shown) to its associated test module interface.

Device information 604 and device information 624 each include device specific information such as a device name, a mnemonic, help text, and configuration text, a pointer (not shown) to a test module information such as test module information 600, a next pointer to a next device such as pointer 622, a pointer to a list of tests for this device such as pointer 606, and a pointer to a set of parameters for this device such as pointer 626.

Test information 608 and test information 620 each include test specific information such as a test name, a mnemonic, help test, a test number, and flags for controlling the behavior of a test function, a pointer (not shown) to a test program entry point, pointers to a list of parameters that are specific to a test such as pointer 610, a pointer to a next test such as pointer 618, and a pointer (not shown) back to a device.

Parameter information 612, parameter information 616, parameter information 628, and parameter information 632 each include parameter specific information such as a parameter name, a mnemonic, help text, flags for controlling the display of the parameter, and a type of the parameter, a pointer to a next parameter such as pointer 630, and parameter data such as a pointer (not shown) to a list of choices for the parameter.

As described above, an executive causes test configuration 650 of a test module to be created and stored in a memory using a test module interface of the test module. In the example shown in FIG. 6, the executive receives a pointer 660 to indicate a location of test configuration 650 in memory. The executive then parses the test configuration to detect test programs and other information available in the test module. The executive can provide information from test configuration 650 to a user interface and the user interface can present the information to a user in any appropriate form such as a test menu or a graphical point and click interface.

As can be seen, a principal advantage of this embodiment is that it allows a test module to be used in a build-to-order manufacturing environment. The test module is loaded onto a build-to-order computer system. A test module interface associated with the test module provides a user interface or other program with the ability to select test routines or other information in the test module. The test module interface may be created using the capabilities of an interface between an operating system and platform firmware. In addition, the use of an interface between an operating system and platform firmware allows the test module interface to be registered with a registration module and to be dynamically reinstalled. The registration module provides test modules with the ability to register uses of a particular test module to ensure that that particular test module does not unload prematurely.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A method performed by a computer system comprising:
providing a test module for dynamically reinstalling an associated test module interface at anytime without rebooting the computer system, in response to a device change associated with the test module;
in response, unloading the test module associated with the changed device and causing its test module interface to be reinstalled without rebooting the computer system;
using a registration module to register uses of the test module by a plurality of programs so that no other program attempts can access information associated with the test module after it unloads;
in response to the test module seeking to unload, accessing the registration module to determine what other programs are registered as using the test module;
notifying each of the programs to stop using the test module;
each program responding that they have stopped using the test module or are still using the test module;
the test module causing itself to unload in response to programs responding that using the test module is stopped; and
the test module cancelling unloading in response to programs responding that the test module is being used, whereby the test module may unload at a later time.

2. The method of claim 1, further comprising:
calling a function identified by a test module interface to cause a first test configuration of the test module to be created;
detecting a test routine associated with the test module using the first test configuration; and
causing the test routine to be executed.

3. The method of claim 2, further comprising:
in response to detecting the change,
calling the function to cause a second test configuration of the test module to be created.

4. The method of claim 1, further comprising:
registering a use of the test module by a program.

5. The method of claim 4, further comprising:
unloading the test module; and
informing the program of the unloading prior to unloading the test module.

6. The method of claim 5, further comprising:
conveying a defer signal from the program to the test module; and
in response to the defer signal, canceling the unloading of the test module.

7. A computer system comprising:
a processor;
a memory coupled to the processor;

a test module dynamically reinstalling its test module interface at any time without rebooting the computer system, in response to a device change associated with that test module;

in response, the test module associated with the changed device being unloaded and causing its test module interface to be reinstalled without rebooting the computer system;

a registration module being used to register uses of the test module by a plurality of programs so that no other program attempts to access information associated with the test module after it unloads;

means for accessing the registration module to determine what other programs are registered as using the test module;

means for notifying each of the programs to stop using the test module;

means for each program to respond that they have stopped using the test module or are still using the test module;

means for the test module to cause itself to unload in response to programs responding that using the test module is stopped; and means for the test module to cancel unloading in response to programs responding that the test module is being used, whereby the test module may unload at a later time.

8. The computer system of claim 7, wherein the system:

calls a function identified by a test module interface to cause a first test configuration of the test module to be created;

detects a test routine associated with the test module using the first test configuration; and causes the test routine to be executed.

9. The computer system of claim 8, wherein the function identified by the test module interface is called to cause a second test configuration of the test module to be created.

10. The computer system of claim 7, wherein a use of the test module by the program is registered.

11. The computer system of claim 10, wherein the test module is unloaded; and the program is notified of the unloading prior to unloading the test module.

12. The computer system of claim 11, wherein a defer signal is conveyed from the program to the test module; and in response to the defer signal, the unloading of the test module is canceled.

* * * * *